United States Patent [19]
Pickering et al.

[11] 4,405,990
[45] Sep. 20, 1983

[54] APPARATUS FOR DETERMINING THE RATIO OF TWO SIGNAL REPETITION RATES

[75] Inventors: William Pickering, Cuyahoga County, Ohio; David J. Urbanc, Peoria, Ill.

[73] Assignee: Caterpillar Tractor Co., Peoria, Ill.

[21] Appl. No.: 282,999

[22] PCT Filed: May 26, 1981

[86] PCT No.: PCT/US81/00711
§ 371 Date: May 26, 1981
§ 102(e) Date: May 26, 1981

[87] PCT Pub. No.: WO82/04338
PCT Pub. Date: Dec. 9, 1982

[51] Int. Cl.³ .......................... G06F 7/68; G01L 19/04
[52] U.S. Cl. ..................................... 364/703; 73/708; 324/140 D; 364/571
[58] Field of Search ............... 364/571, 701, 703, 761; 328/161; 324/140 D; 307/525, 529; 73/708, 765, 766, 861.01

[56] References Cited
U.S. PATENT DOCUMENTS
2,641,706  6/1953  Dickinson ............................. 250/36
3,040,983  6/1962  Bigelow ......................... 324/140 D
3,355,949 12/1967  Elwood et al. ........................ 73/345
3,424,980  1/1969  Anderson ......................... 364/703 X
3,681,586  8/1972  Kitaura ............................ 364/701 X
3,739,156  6/1973  Gebelein, Jr. et al. ............. 364/703
3,821,536  6/1974  Berg ..................................... 364/701
3,943,341  3/1976  Corsi et al. ........................... 364/701
4,208,918  6/1980  Miyamae ............................... 73/708
4,244,027  1/1981  Shai .................................... 364/703

Primary Examiner—Jerry Smith
Attorney, Agent, or Firm—Krass & Young

[57] ABSTRACT

A measurement circuit which is rendered insensitive to temperature and other environmental quantities comprising first and second electrically identical sensor elements (10, 12) which are alternately connected through multiplexed gates (G1, G2) into the tank circuit of an oscillator (14) to generate first and second signal frequencies $f_1$ and $f_2$. The first frequency $f_1$ varies in the same sense with both temperature and the measured signal quantity but the second signal $f_2$ varies in one sense with temperature and in the opposite sense with the measured signal quantity. A logic circuit (18) is provided for generating an output signal proportional to the ratio of $f_1$ and $f_2$. The ratio of the two signals is achieved by frequency dividing $f_1$ and using the result as a variable length gating signal for $f_2$. A non-multiplexed system using matched oscillators is also disclosed.

19 Claims, 5 Drawing Figures

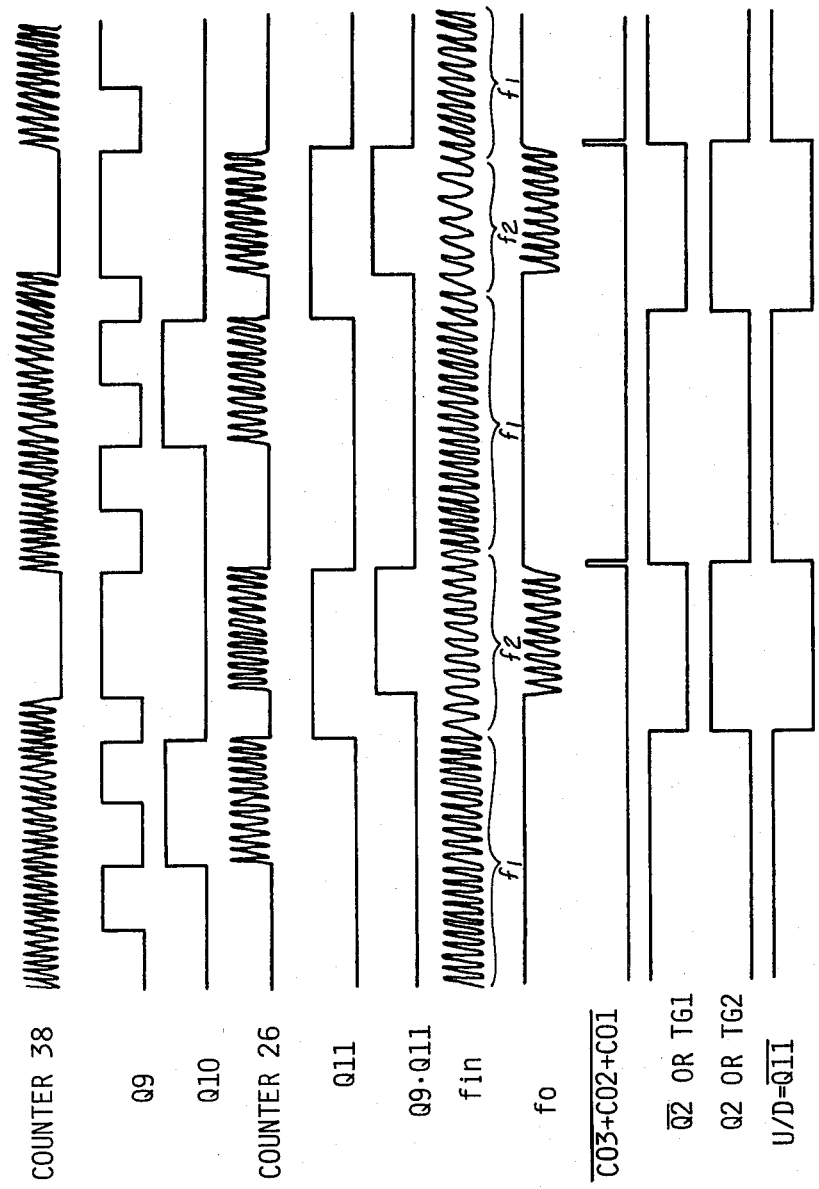

APPARATUS FOR DETERMINING THE RATIO OF TWO SIGNAL REPETITION RATES

DESCRIPTION

1. Technical Field

This invention relates to an apparatus for producing an output signal having a pulse repetition rate which varies directly as a function of the ratio of two input signal repetition rates. The apparatus embodying the invention can be used to advantage to render measurement circuits insensitive to extraneous effects such as ambient temperature changes.

2. Background Art

It is well known to represent a varying quantity in terms of the repetition rate of a timevarying signal such as a pulse train or sinusoidal waveform. For example, an electrical component such as a variable resistor, capacitor, inductor or a combination of these may be connected into the tank circuit of an oscillator to vary the output repetition rate (frequency) of the oscillator as a function of some quantity which influences the electrical component.

In certain instances, it is desirable to ascertain the ratio between two such repetition rates. One technique for determining a ratio involves a conversion of each ratio to an analog current and causing these currents to pass through inductors, the output fields of which influence the position of a movable magnet. The ratio of rates is thus represented as the resultant of two non-parallel magnetic fields.

Another apparatus for computing repetition rate ratios is shown in U.S. Pat. No. 3,040,983 to Bigelow, "Pulse-Train Ratio Apparatus" granted June 26, 1962. In the Bigelow circuit, two rate signals are simultaneously received on separate channels, each channel including circuitry for converting its input pulse train into an analog voltage proportional to pulse rate. These two analog voltages are applied to different inputs of a DC operational amplifier such that, for a given time interval, the amplitude and polarity of the amplifier output represents the ratio of input rates.

There exists a need for relatively simple circuitry for direct determination of repetition rate ratios which does not depend upon conversion to analog signal form and which is readily compatible with digital data processing apparatus.

DISCLOSURE OF THE INVENTION

In one aspect, the invention provides a circuit for the direct and precise determination of repetition rate ratios using digital techniques which require neither magnetic field resolution nor analog voltage generation. In general, this is accomplished by alternately inputting two signals whose repetition rates are to be ratioed, generating a gating pulse which varies in length inversely with the first rate ($f_1$) and gating a portion of the second rate ($f_2$) onto an output terminal in accordance with the length of the gating pulse.

In another aspect, the invention provides a method and apparatus for compensating measurement circuits for the effects of extraneous influences such as temperature. In general this is accomplished by generating first and second signal quantities which vary in repetition rate similarly or in like sense in response to extraneous changes but which vary in repetition rate dissimilarly or in an opposite sense in response to measured signal quantity changes, and digitally deriving the ratio of the two component signal quantities as a stabilized indicator of changes in the measured quantity.

BRIEF DESCRIPTION OF THE DRAWINGS

FIGS. 2 and 2A are charts of signal waveforms which are generated in the circuit of FIG. 1;

BEST MODE FOR CARRYING OUT THE INVENTION

Figure 1:
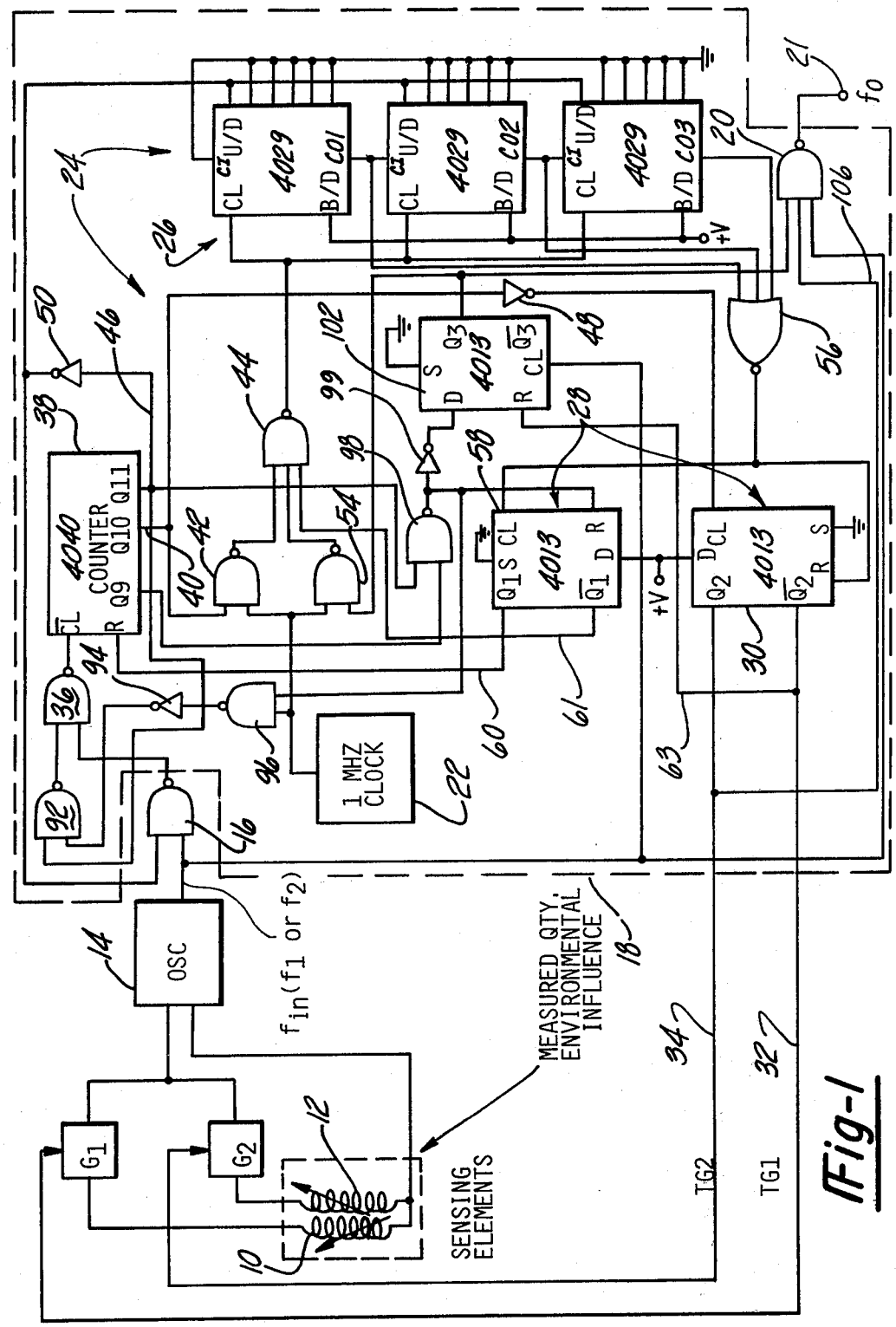
FIG. 1 is a detailed circuit diagram of one apparatus embodying the invention.

FIG. 1 illustrates a first embodiment of the invention comprising a matched pair of inductive sensing elements 10 and 12. Sensing elements 10 and 12 are connected through complementally operated signal transmission gates G1 and G2 to an oscillator 14 where they alternately act as frequency determining elements, i.e., the sensing elements 10 and 12 are connected through the gates into the tank circuit of the oscillator 14 to alternately influence the output frequency of the oscillator in accordance with the electrical impedance or reactance value represented by the element which is so connected. Gates G1 and G2 are operated in a multiplexing mode to permit the use of a single oscillator 14 serving both sensing elements 10 and 12.

The time multiplexed outputs of the oscillator 14 are connected through a wave-shaping buffer 16, which may comprise an inverter, a NAND gate or the like, to a logic circuit 18 which produces an output signal at terminal 21 related to the ratio of the two input signal repetition rates, hereinafter called $f_1$ and $f_2$. The principal elements of the circuit 18 comprise a one $MH_z$ clock source 22, a logic circuit 24 for connecting the clock 22 to a bank of 4029 counters 26 in both up and down count modes, a pair of 4013 flip-flops 28 which control the various components of circuit 18 as well as the conductivity of the two transmission gates G1 and G2, and a synchronizing circuit comprising a 4013 flip-flop 102 which synchronizes the repetition rates $f_1$ and $f_2$ in order to prevent an erroneous, extra count from being delivered to the output 21. It will be noted that industry standard numbers for commercially available integrated circuits are utilized herein wherever possible.

Describing the circuit in FIG. 1 in greater detail, timing signals generated by the complemental outputs of flip-flop 30 on lines 32 and 34 render gates G1 and G2 alternately conductive. Assuming for the moment that line 32 is high and line 34 is low, gate G1 is rendered conductive and therefore couples sensing element 10 with the input of the oscillator 14; this results in the production of an oscillator output having the frequency $f_1$. The $f_1$ frequency signal is passed through NAND gates 16 and 36 to the input of counter 38. Counter 38 is of a 4040 type which acts as a frequency divider and includes outputs Q9, Q10 and Q11 that provide output pulses which are time divided multiples of the input frequency; for example, the Q10 output provides a division factor of 512. After the prescribed number of pulses of the input frequency $f_1$ are received by the counter 38, the Q10 output goes high. The high pulse from the Q10 output is delivered via line 40 to one input of NAND gate 42, the second input thereto being connected to the output of the one megahertz clock 22. Consequently, the high output pulse from output Q10 enables NAND gate 42 to pass the one megahertz clock signal through NAND gate 44 to the clock inputs of the counters 26. At this point, the Q11 output of counter 38 is low; this low is inverted to a high signal by inverter 50, which in turn is delivered to one input of the buffer 16 as well as to the up/down input of each of the counters 26.

A high signal on the up/down inputs of counters 26 places the latter in a count-up mode, consequently, the counters 26 begin counting up the pulses of the one megahertz clock signal as long as the Q10 output of counter 38 remains high. It may thus be appreciated that the total magnitude of the count accumulated by counters 26 is determined by the duration of the Q10 output pulse which is in turn inversely proportional to the input frequency $f_1$. It should be noted here that the clock signal is of arbitrarily selected frequency in that it is not related to either of the varying frequency signals which respond to measured quantity changes; however, the clock signal frequency is preferably high in proportion to frequencies $f_1$ and $f_2$. In any event, when the Q10 output goes low, the Q11 output simultaneously goes high. The low signal from the Q10 output is inverted to a high signal by inverter 48 which is then delivered to the clock input of flip-flop 30; flip-flop 30 is responsive to change the status of the signals on lines 32 and 34, i.e., line 32 goes low and line 34 goes high. At this point, gate G2 couples sensing element 12 with the input of oscillator 14 which then generates frequency $f_2$. The low signal from Q10 disables gate 42 and removes the clock signal from NAND gate 44 and the clock inputs of counters 26.

The high signal from the Q11 output is changed to a low state by inverter 50; this low signal switches the counters 26 into a down-count mode and is also delivered to one input of the buffer 16, thereby disabling the output of the latter so as to interrupt delivery of pulses from the oscillator 14 through gate 36 to the counter 38. The high signal from the Q11 output is also delivered through NAND gate 98 to NAND gate 96; gate 96 is responsive to pass the one megahertz clock signal through inverter 94 and through gates 92 and 36 to the input of counter 38 which then processes the incoming one megahertz clock signal. The time interval during which the counter 38 processes the one megahertz clock signal provides a delay period during which the output frequency of the oscillator 14 is being switched from $f_1$ to $f_2$. This delay period allows the output of the oscillator 14 to stabilize on frequency $f_2$ immediately following the switching of gates G1 and G2.

Counter 38 processes the one megahertz clock signal until the Q9 output goes high. Simultaneous high signals on outputs Q9 and Q11 are processed by gates 98 and 96 which function to terminate delivery of the one megahertz clock signal to the counter 38. Additionally, simultaneous highs on the Q9 and Q11 outputs pass through gate 98 and inverter 99 to flip-flop 102 which is set by the next $f_2$ pulse. Flip-flop 102 then delivers a high signal to NAND gate 54 which allows the one megahertz clock signal to be delivered from the clock 22 through NAND gate 44 to clock inputs of the counters 26. With the counters 26 in a count-down mode (as a result of the Q11 output having gone low), the counters 26 commence counting down in accordance with the one megahertz clock signal. The setting of flip-flop 102 also results in the delivery of a gating signal from the Q3 output of flip-flop 102 to one input of NAND gate 20, two additional inputs to NAND gate 20 being respectively coupled to line 34 via line 106 and to the output of oscillator 14. Thus, the gating signal from the Q3 output of flip-flop 102 causes NAND gate 20 to deliver a synchronized frequency $f_2$ signal to the output terminal 21.

When the counters 26 count down to zero, high output signals from the carry-out lines CO1, CO2, CO3 of counters 26 are delivered to the inputs of NOR gate 56 causing the latter to produce a signal on its output. The output signal from gate 56 clocks (sets) flip-flop 58 and resets flip-flop 30. In response to the set signal, flip-flop 58 delivers a signal on line 60 which resets the counter 38. With counter 38 reset, the Q9, Q10 and Q11 outputs go low; the low signal on the Q11 output is inverted by inverter 50 and places the counters 26 in the up-count mode. Simultaneous with the resetting of counter 38, flip-flop 58 also delivers a signal on line 61 to one input of NAND gate 44 which disables the latter's output to terminate delivery of the one megahertz clock signal to the counters 26. Thus, the counters 25 count-down to zero and remain at a zero count until subsequently placed in the count-up mode by a low signal on the Q11 output. Resetting of flip-flop 30 by the output of gate 56 causes lines 32 and 34 to be reset to their original states, i.e., line 32 is high and line 34 is low. Resetting of flip-flop 30 also results in a reset signal being delivered on line 63 to the reset input of flip-flop 102. Upon resetting of flip-flop 102, the Q3 output thereof goes low and the output of gate 20 is disabled. At this point, the circuitry has returned to its original starting condition in preparation for the next counting cycle.

Figure 2A:
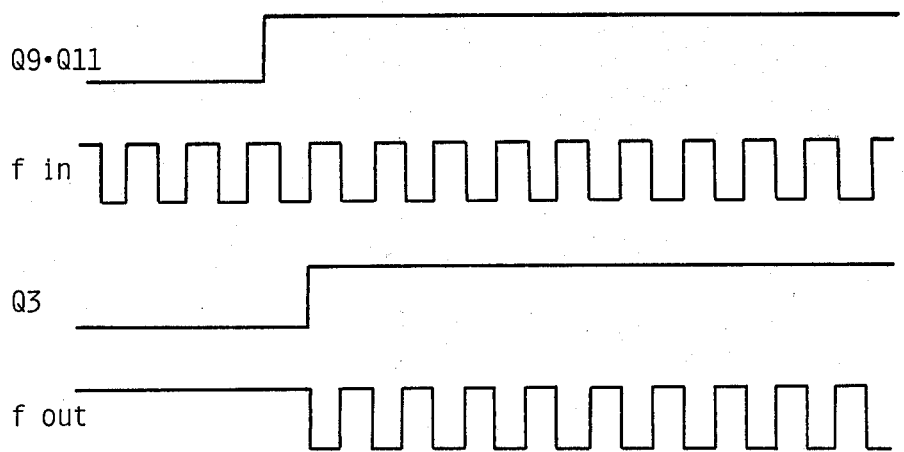

The output $f_o$ of gate 20 (shown in FIG. 2) is, by reason of the foregoing apparatus and operation thereof, proportional to the ratio of the signal frequencies $f_1$ and $f_2$.

Figure 3:
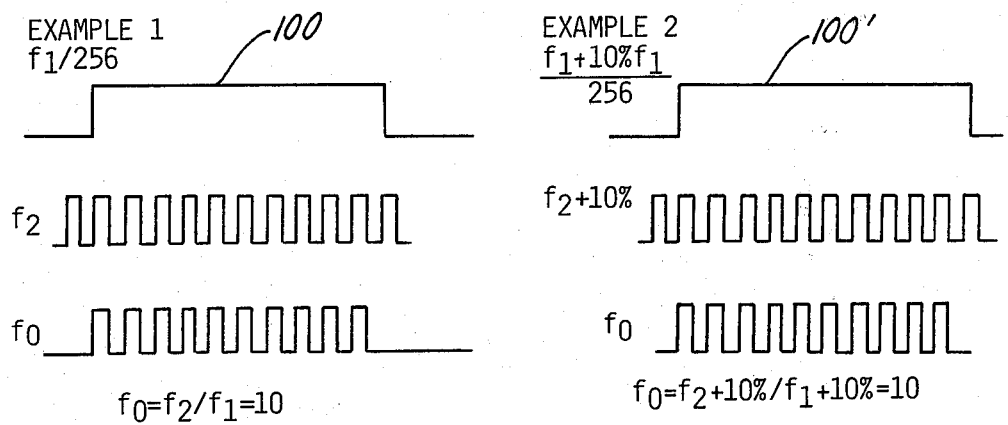
FIG. 3 is a simplified waveform diagram illustrating the mathematics of ratio determination according to the invention; and, FIG. 4 is a detailed circuit diagram of an apparatus embodying an alternate form of the invention.

FIG. 3 represents two examples of ratio determination. Example 1 illustrates a pulse 100 proportional in time duration to the $f_1$ rate. In fact, it is equal to 256 times the nominal pulse duration of $f_1$ due to the frequency division performed by counter 38. The rate $f_2$ is such that ten (10) pulses occur within the length of the pulse 100. When pulse 100 is used as a gating pulse, such as by application to gate 20, the output $f_o$ is proportional to $f_2 \div f_1$, or in this example, 10 pulses per unit time.

If, as shown in example 2, each of $f_1$ and $f_2$ increases by ten percent (10%), the ratio $f_o$ may be expected to remain constant. Indeed, the duration of pulse 100' decreases by ten percent (10%) due to the increased rate of which $f_1$ pulses occur, and exactly compensates for the ten percent (10%) increase in the number of $f_2$ pulses which occur in the original time period. Hence, the number of output ($f_o$) pulses per unit time remains constant at ten.

Generalizing, the relation is:

$$f_o = (f_2 \times N)/f_1$$

where:
$f_o$ is the output rate
$f_1$ is the input rate
$f_2$ is the other input rate
N is the division factor of element 38.

Figure 4:
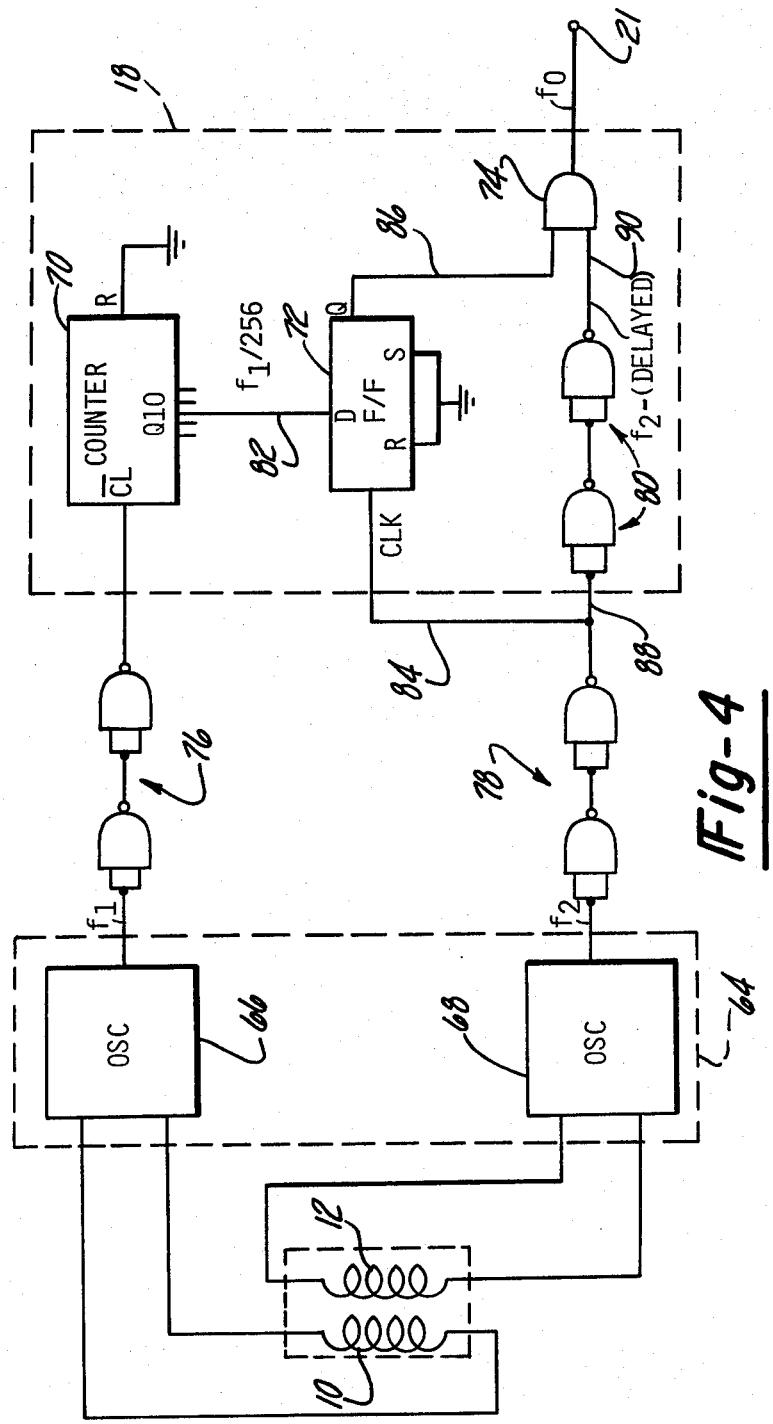

Another embodiment of the invention which does not require multiplexing input gates is shown in FIG. 4. Referring now to FIG. 4, matched inductive elements 10 and 12 are respectively connected to the tank circuits of matched oscillators 66 and 68 in oscillator base 64 to produce respective variable frequencies $f_1$ and $f_2$ related to the values of elements 10 and 12. Oscillators 66 and 68 operate on a common center frequency. The values of elements 10 and 12 alter the respective output frequencies $f_1$ and $f_2$ of the associated oscillators 66 and 68 in accordance with changes in the magnitudes of electrical impedance or reactance of such elements.

The signals output from oscillators 66 and 68 having frequencies $f_1$ and $f_2$ are delivered through respectively associated wave-shaping buffers such as NAND gates 76 and 78 which function to square-up such signals for later processing. The outputs of gates 76 and 78 are connected to circuit means 18 which is adapted to produce an output signal having a frequency $f_0$ proportional to the ratio of the input frequencies $f_1$ and $f_2$. Circuit means 18 includes frequency divider means in the nature of a counter 70, a bistable circuit comprising a flip-flop 72, a pair of series connected NAND gates 80, and output gate means comprising AND gate 74.

The signal output from oscillator 66 having frequency $f_1$ is delivered to the clock input of counter 70 which is of a 4040 type and acts as a frequency divider having a division factor of 512. The incoming frequency $f_1$ is divided by 512 by the counter 70 such that the Q10 output of counter 70 is a time divided multiple of frequency $f_1$. The time divided multiple of frequency $f_1$ is delivered via line 82 to the "D" input of the D-type flip-flop 72, while the frequency $f_2$ output of oscillator 68 is delivered to the clock input of flip-flop 72 on line 84. The signal present on the D input of flip-flop 72 is effectively transferred to the Q output thereof upon each clock pulse received on line 84. The Q output of flip-flop 72 is delivered by line 86 to one input of AND gate 74. The frequency of $f_2$ output from oscillator 68 is also delivered to an input of AND gate 74 via lines 88 and 90, through NAND gates 80.

NAND gates 80 function to delay delivery of the $f_2$ frequency signal to gate 74 for a duration essentially equal to the delay of the delivery of the output of counter 70 to gate 74 imposed by flip-flop 72.

Flip-flop 72 is operative to synchronize the timing of the $f_1$ and $f_2$ signals since the outputs of oscillators 66 and 68 are asynchronous.

The output signal from gate 74 has a frequency $f_0$ which is proportional to the ratio of the signal frequency $f_1$ and $f_2$ and remains stable despite environmental variation which alters the electrical values of the sensing elements 10 and 12 in the same sense. However, as the signal frequency values $f_1$ and $f_2$ vary in opposite directions, the ratio changes proportionately and provides an environmentally independent indication of the measured quantity.

It is appropriate to note that the output of $f_0$ may not necessarily possess infinite resolution and will be automatically rounded to the highest count. For example, since the pulses output by oscillators 66 and 68 are asynchronous, a small portion of the pulse of signal $f_2$ will be counted by the circuit as a full pulse or count; thus, if 5-¼ pulses are processed by the circuit, six counts will result. The counter 70 divides the frequency $f_1$ of the input signal by a factor of 512 and the time divided multiple of the input signal appears at the Q10 output of counter 70. Resolution is determined by the range or variation of the input frequencies $f_1$ and $f_2$.

INDUSTRIAL APPLICABILITY

The apparatus described in the foregoing is applicable to a wide variety of precise measurement applications but may be readily understood by reference to the application to linear position measurement in an environment of changing temperature.

Sensing elements 10 and 12 are preferably selected and located to exhibit similar, i.e., matched, responses to environmental conditions such as temperature. In other words, a given variable in the ambient temperature produces the same magnitude and sense of change in electrical character for each of the two sensing elements. However, the sensing elements 10 and 12 are conditioned with respect to the measured quantity to respond in opposite sense; for example, where the sensing elements 10 and 12 are inductors employed in a movable core type linear position detector, the core elements of the respective sensing elements 10 and 12 are mechanically interconnected such that a positional change in the device being monitored moves one core farther into its associated inductor and the other core farther out of its associated inductor to produce electrical value changes of opposite sense. This is given merely by way of example as it will be immediately appreciated that the same end can be achieved using resistors and capacitors as well as a combination of electrical components.

As is described above, inductive sensing element 10 is provided with an internally movable core which is mechanically connected to the device whose position is to be monitored whereby the core moves farther into the inductive element 10 with a rightward movement and farther out of the element with a leftward movement. Conversely, the inductive sensing element 12 is provided with a movable internal core which is mechanically connected to the device being monitored in such a fashion as to move the core farther out of the element with a rightward movement of the device and farther into the element with leftward movement of the device. As a result, the two inductive sensing elements 10 and 12 respond in the same sense to temperature changes but in opposite sense to movement of the element whose position is to be measured.

Operation of the circuit 18 in the fashion described above produces a time multiplexed series of signals $f_1$ and $f_2$ which are applied to the circuit 18 through gate 16. Counter 38 operates to divide the $f_1$ signal and produces a gating pulse on the Q10 output thereof whose duration is inversely proportional to the frequency of the $f_1$ signal. During the period of the gating pulse on the Q10 output, pulses from the one megahertz clock 22 are stored in the counter 26 as a count-up function. Because the frequency of clock 22 is fixed, the pulse count in counters 26 represents a fixed time period which can be regenerated by counting down to zero. At the termination of the Q10 gating pulse, the gates G1 and G2 are toggled and $f_2$ is applied to the output by way of gate 20 for exactly the period set by $f_1$ so the relevant periods of $f_1$ and $f_2$ remain in fixed ratio despite changes in $f_1$. At the same time, clock pulses are applied through gates 54 and 44 to count the counter banks 26 to zero. When the zero count is reached, the output 20 ceases and the circuit is reconditioned to the quiescent state for the next cycle of operation.

The processing of the signal output from gate 20 may be varied to suit the particular user; however, in a representative example, the number of $f_2$ pulses which occur during the gating pulse time are counted and averaged as an indication of the ratio $f_1$ and $f_2$. The signal, because of its form, is readily adaptable to a modern signal processing and data storage equipment as will be apparent to those skilled in the art.

From the foregoing, it is apparent that a novel method of deriving a temperature stabilized signal representing changes in a measured quantity is provided, which comprises the steps of (a) generating a first signal quantity $f_1$ through the combination of sensing element 10 and oscillator 14 which varies in one sense with changes in both measured signal quantity and environmental quantity, (b) generating a second signal quantity $f_2$ through the operative combination of sensing element 12 and oscillator 14 which varies in one sense with changes in the environmental quantity but in the opposite sense with changes in the measured signal quantity and (c) operatively and arithmetically combining the two signal quantities in the logic circuit 18 to produce an output signal quantity at gate 20 proportional to the ratio of the two input signal quantities. In the specific apparatus disclosed herein, this is most straightforwardly carried out by frequency division of the $f_1$ signal to produce a variable duration gating pulse and the use of the variable duration gating pulse to gate the $f_2$ signal to the output terminal.

It is to be understood that the invention has been disclosed with reference to illustrative embodiments and that various modifications and additions will be apparent to those skilled in the art. It should be further understood that the invention may be adapted to applications other than the measurement of linear position. Examples are the measurements of pressure, humidity, liquid level, light level and acoustic conditions. Similarly, the circuit may be rendered insensitive to environmental conditions other than temperature; examples are humidity, air pressure and any other variations affecting both frequencies similarly, such as fluctuations in a power supply that create variations in supply voltage. For example, the circuit shown in FIG. 4 may be readily modified so as to be insensitive to such variations by operating one of the oscillators 66 and 68 at a fixed frequency and coupling a condition responsive sensor to the other of the oscillators 66 or 68 which senses such variations and alters the operative frequency of the other oscillator 66 or 68 to which it is attached in accordance with the sensed variations. Other aspects, objects and advantages of this invention can be obtained from a study of the drawings, the disclosure and the appended claims.

We claim:

1. Apparatus for producing an output signal ($f_0$) the average repetition rate of which is proportional to the ratio of two input signals having respective repetition rates $f_1$ and $f_2$ comprising:
   input means (18) for receiving at least representative portions of the two signals $f_1$ and $f_2$;
   means (38, 70) for generating a gating pulse which is inversely proportional in length to the repetition rate of the signal $f_1$;
   gate means (20, 74) for receiving the signal $f_2$ and the gating pulse and outputting the signal $f_2$ as the output signal ($f_0$) for the duration of the gating pulse, said gate means (20, 74) being responsive to said gating pulse;
   means (102, 72) for synchronizing the delivery of said gating pulse and the signal $f_2$ to said gate means; and
   output means (21) for receiving said output signal ($f_0$).

2. Apparatus as set forth in claim 1, wherein the means (18) includes:
   frequency divider means (38) for receiving the signal ($f_1$) and for generating a gating pulse proportional in length to the time between N repetitions of $f_1$; and,
   means (26,42,44) for generating a count proportional to said gating pulse.

3. Apparatus as set forth in claim 2, wherein the means (18) includes:
   clock means (22) for generating clock signals at a rate greater than $f_1$ and $f_2$;
   means (26) for storing the clock signals for a period proportional to the length of the gating pulse; and
   means (40) for delivering the gating pulse to the generating means (26,42,44).

4. Apparatus as set forth in claim 1, wherein the synchronizing means (102,72) includes a bistable circuit coupled with at least one input of said gate means (20,74) and having inputs for receiving said gating pulse and the signal $f_2$.

5. Apparatus for producing an output ($f_0$) responsive to a measured quantity, comprising:
   a first sensing element (10) having a preselected electrical character and being exposed to the measured quantity and to an extraneous quantity and producing a first signal ($f_1$) of proportionately changing value in response to said measured quantity and said extraneous quantity;
   a second sensing element (12) having a like electrical character as the first sensing element (10) and being exposed to the measured and extraneous quantities and producing a second signal ($f_2$) of proportionately changing value in response to said measured quantity and said extraneous quantity, each of said sensing elements (10,12) being conditioned to respond similarly to the extraneous quantity but dissimilarly to the measured quantity; and,
   circuit means (18) for receiving the first and second signals and producing an output signal ($f_0$) on an output (21) proportional to the ratio of said signals.

6. Apparatus as set forth in claim 5, wherein the first signal ($f_1$) is an electrical signal quantity of varying frequency and the second signal ($f_2$) is an electrical signal quantity of varying frequency.

7. Apparatus as set forth in claim 6, wherein the circuit means (18) includes a frequency divider means (38) for receiving the first signal ($f_1$) and producing a gating signal, and gating means (20) for transmitting the second signal ($f_2$) to the output (21).

8. Apparatus as set forth in claim 7, wherein said frequency divider means (38) includes a first output position (Q10) and a second output position (Q11) representing a time period which varies with the frequency of the first signal ($f_1$), and said circuit means (18) includes reset circuit means (26,58) for resetting the frequency divider means (38).

9. Apparatus as set forth in claim 7, including multiplexer means (G1,G2,30) for alternately applying the first and second signal quantities to the logic circuit means (18).

10. Apparatus as set forth in claim 5, wherein the extraneous quantity is an environmental quantity and wherein the sensing elements (10,12) are adapted to respond in like sense to the environmental quantity and in opposite sense to the measured quantity with the output remaining constant with changes in the environmental quantity and varying with changes in the measured quantity.

11. Apparatus as set forth in claim 5, including means (64) for varying the frequencies of said first and second signals ($f_1, f_2$) in proportion to said measured and extraneous quantities.

12. Apparatus as set forth in claim 11, wherein said means (64) for varying the frequencies of said first and second signals ($f_1, f_2$) includes a pair of oscillator circuits (66, 68) respectively connected between said circuit means (18) and said first and second sensing elements (10, 12).

13. Apparatus as set forth in claim 12, wherein said circuit means (18) includes frequency divider means (70) for receiving said first signal ($f_1$) and producing a gating signal having a frequency that is a time divided multiple of the frequency of said first signal ($f_1$).

14. Apparatus as set forth in claim 13, wherein said circuit means (18) includes a bistable circuit (72) having:
    a first input (84) coupled with one of said oscillator circuits (68) and being adapted to receive said second signal ($f_2$),
    a second input (82) coupled with said frequency divider means (70) and being adapted to receive said gating signal, and
    output means (86) for outputting said gating signal in response to the frequency of said second signal ($f_2$),
    said circuit means (18) including a gate (74) having a pair of inputs respectively coupled with said output means (86) and with said one oscillator circuit (68) and being adapted to produce said output signal ($f_0$).

15. A method for deriving a signal which is stabilized with reference to an extraneous quantity but which represents changes in a measured quantity, comprising:
    (A) generating a first signal quantity ($f_1$), which varies similarly with both the measured quantity and the extraneous quantity,
    (B) generating a second signal quantity ($f_2$), which varies dissimilarly in response to the measured signal quantity and varies similarly with the extraneous quantity,
    (C) producing a gating signal which is inversely proportional in duration to the frequency of the first signal quantity ($f_1$);
    (D) synchronizing the second signal quantity ($f_2$) with the gating signal;
    (E) then, simultaneously receiving the gating signal and the second signal quantity, and
    (F) producing a gated output signal ($f_0$) proportional to the ratio between the first and second signal quantities upon simultaneous receipt of said gating signal and said second signal quantity ($f_2$).

16. The method of claim 15, including:
    (G) delaying the receipt of said second signal quantity ($f_2$) for a duration substantially equal to the time period required to perform step (D).

17. The method of claim 15 wherein step (d) includes:
    dividing the frequency of the first signal quantity ($f_1$) to generate a given signal of inversely proportional duration;
    storing clock pulses in a counter for the duration of the given signal; and
    using the stored contents of the counter to define the duration of the gating signal.

18. Apparatus for producing an output signal ($f_0$) the average repetition rate of which is proportional to the ratio of two input signals having respective repetition rates ($f_1$) and ($f_2$), said apparatus comprising:
    frequency divider means (38) for receiving the signal ($f_1$) and for generating a pulse inversely proportional in length to the repetition rate of the signal ($f_1$);
    clock means (22) for generating clock signals at a rate greater than ($f_1$) and ($f_2$);
    means (26) for storing the clock signals for a period proportional to the length of the pulse;
    gate means (20, 74) coupled to the storing means and said signal ($f_2$) for outputting the signal ($f_2$) as the output signal ($f_0$) for a time period associated with the stored clock signals when the gate means is enabled; and
    synchronization means (102, 72) for enabling the gate means (20, 74) in synchronization with the signal $f_2$.

19. Apparatus for producing an output ($f_0$) responsive to a measured quantity, said apparatus comprising:
    first and second sensing elements (10, 12), at least one of the sensing elements being exposed to the measured quantity;
    a pair of oscillator circuits (66, 68) respectively connected to said first and second sensing element (10, 12), said first oscillator (66) being adapted to generate a first signal with a frequency $f_1$, and said second oscillator (68) being adapted to generate a second signal with a frequency ($f_2$);
    frequency divider means (70) for receiving said first signal ($f_1$) and producing a gating signal having a frequency that is a time divided multiple of the frequency of said first signal ($f_1$);
    a bistable circuit (72) including a first input (84) adapted to receive said second signal ($f_2$), a second input (82) adapted to receive said gating signal, and output means (86) for outputting said gating signal in response to the frequency of said second signal ($f_2$); and
    a gate (74) having a pair of inputs respectively coupled to said output means (86) and to said second signal ($f_2$), adapted to produce an output signal ($f_0$) proportional to the ratio of said signals ($f_1, f_2$).

* * * * *